United States Patent [19]

Kassai

[11] Patent Number: 4,714,261
[45] Date of Patent: Dec. 22, 1987

[54] STEERING WHEEL FIXING CONSTRUCTION FOR TOY VEHICLES

[75] Inventor: Kenzou Kassai, Osaka, Japan

[73] Assignee: Aprica Kassai Kabushikikaisha, Osaka, Japan

[21] Appl. No.: 899,809

[22] Filed: Aug. 25, 1986

[30] Foreign Application Priority Data

Aug. 29, 1985 [JP] Japan .............................. 60-132549[U]

[51] Int. Cl.4 .......................... B62K 5/08; B62M 1/00
[52] U.S. Cl. ........................................ 280/7.1; 70/210;
74/492; 74/552; 280/87.02 R; 280/267; 280/272
[58] Field of Search .................... 280/267, 272, 289 L, 280/7.1, 7.17, 89, 87.04, 7.15; 74/813 L, 492, 495, 552; 70/226, 210, 183

[56] References Cited

U.S. PATENT DOCUMENTS 989,897  4/1911  Douthitt .............................. 74/495
2,077,274  4/1937  Silkman ............................ 280/87.04
4,261,588  4/1981  Kassai ................................. 280/272

FOREIGN PATENT DOCUMENTS 17432  5/1985  Japan .

Primary Examiner—John J. Love
Assistant Examiner—Everett G. Diederiks, Jr.
Attorney, Agent, or Firm—W. G. Fasse; D. H. Kane, Jr.

[57] ABSTRACT

A steering wheel fixing construction for toy vehicles has front wheel support rod which projects beyond the upper surface of a toy body. A sleeve integral with a steering wheel is removably fitted on the projecting portion of the front wheel support rod. The portion of the upper surface of the toy body around the front wheel support rod has with a relatively narrow groove and a relatively wide groove. The sleeve has an engaging projection sized to snugly fit in the narrow groove. The engaging projection can be selectively positioned in the narrow groove or in the wide groove. If the projection is positioned in the narrow groove, the rotation of the steering wheel is inhibited. If the engaging projection if positioned in the wide groove, the rotation of the steering wheel is allowed.

1 Claim, 8 Drawing Figures

STEERING WHEEL FIXING CONSTRUCTION FOR TOY VEHICLES

BACKGROUND OF THE INVENTION

1. Field of the Invention

This invention relates to a steering wheel fixing construction for toy vehicles, particularly to a steering wheel fixing device constructed selectively allowing or inhibiting the turning movement of front wheels.

2. Description of the Prior Art

There is a toy vehicle having front wheels which can be turned by operating the steering wheel. For young children, however, the arrangement allowing the front wheels to turn is not desirable from the standpoint of safety. Therefore, a steering wheel fixing device is desirable which is so constructed that when a child is still young the front wheels are made unturnable but when the child grows up to some degree, the front wheels are made turnable.

As an arrangement which satisfies such a desire, there is a steering wheel mechanism for toy vehicles disclosed in Japanese Utility Model Publication No. 17432/1985. This steering wheel mechanism is shown in FIGS. 7 and 8. Referring to these figures, a support cylinder 2 which turnably supports front wheels 1, projects beyond the upper surface of a toy body 3. The projecting portion has a steering wheel 4 attached thereto by a screw 5. The toy body 3 has a support sleeve 6 depending from the upper surface thereof to receive the support cylinder 2. The lower end of the support sleeve 6 has a wide, turn-allowing groove 7 and a narrow, turn-inhibiting groove 8. The support cylinder 2 is in the form of a bar the upper half of which is reduced in diameter as at 9, the diameter-reduced portion 9 having at its lower end an engaging projection 10 sized to snugly fit in the turn-inhibiting groove 8 of said support sleeve 6.

When it is desired to inhibit the turning movement of the front wheels 1, the engaging projection 10 is fitted in the turn-inhibiting groove 8 of the support sleeve 6. On the other hand, when it is desired to allow the turning movement of the front wheels 1, the engaging projection 10 is engaged with the turn-allowing groove 7.

According to the arrangement described above, for a single toy vehicle, it is possible to select two states, one in which the turning movement of the front wheels 1 is possible and the other in which it is impossible. However, the operation involved in switching between the two states is troublesome. More particularly, first, the screw 5 must be removed, followed by the removal of the steering wheel 4 from the support cylinder 2. Then, the toy body 3 is turned upside down and the support cylinder 2 together with the front wheels 1 is extracted from the support sleeve 6 of the toy body 3. The support cylinder 2 is turned through 180° and inserted again into the support sleeve 6. Finally, the steering wheel 4 is fitted on the upper end of the support cylinder 2 and fixed in position by the screw 5. Thus, according to the steering wheel mechanism for toy vehicles disclosed in Japanese Utility Model Publication No. 17432/1985, the operation for switching between one state in which the turning movement of the front wheels is possible and the other in which it is impossible, is troublesome, taking much time and labor, as described above.

SUMMARY OF THE INVENTION

This invention provides a steering wheel fixing construction for toy vehicles wherein a front wheel support rod rotatably supporting front wheels, projects beyond the upper surface of a toy body and the projecting portion of the rod is adapted to removably receive a sleeve which is integral with a steering wheel. The portion of the upper surface of the toy body around the front wheel support rod has a relatively narrow groove and a relatively wide groove. The sleeve has an engaging projection sized to snugly fit in said narrow groove, the arrangement being such that said engaging projection can be selectively positioned in said narrow groove or in said wide groove.

In the engaging projection formed on the sleeve of the steering wheel is positioned in the narrow groove in the upper surface of the toy body, the rotation of the steering wheel is inhibited, with the result that the turning movement of the front wheels is inhibited. On the other hand, if the engaging projection is positioned in the wide groove, the rotation of the steering wheel is possible, with the result that the turning movement of the front wheels is possible. The switching between said two states can be completed by simply removing the steering wheel from the front wheel support rod, changing the position of the steering wheel and fitting the steering wheel again on the front wheel support rod.

As described above, according to this invention, since the upper surface of the toy body is formed with a narrow groove and a wide groove and the sleeve of the steering wheel is formed with an engaging projection sized to snugly fit in the narrow groove, two states can be selectively obtained, one in which the turning movement of the front wheel is allowed and the other in which it is inhibited. Furthermore, in switching between the two states, it is only necessary to extract the steering wheel upwardly. Thus the switching operation is simplified. In other words, the operation of extracting the front support rod from the toy body as in the steering wheel mechanism disclosed in Japanese Utility Model Publication No. 17432/1985 is no longer necessary.

These objects and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
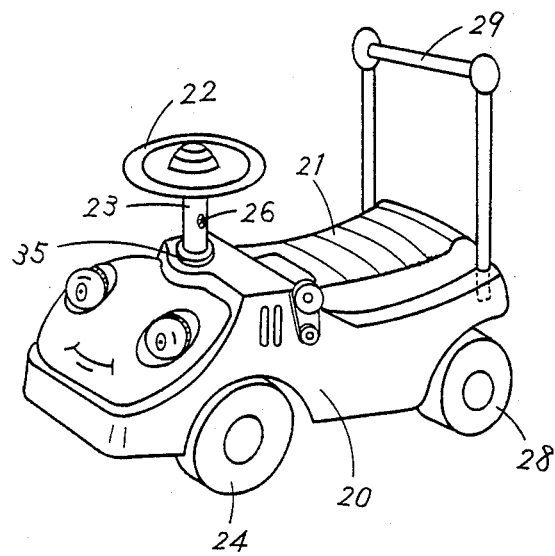
FIG. 1 is a perspective view of a toy vehicle to which an embodiment of this invention is applied.
Figure 2:
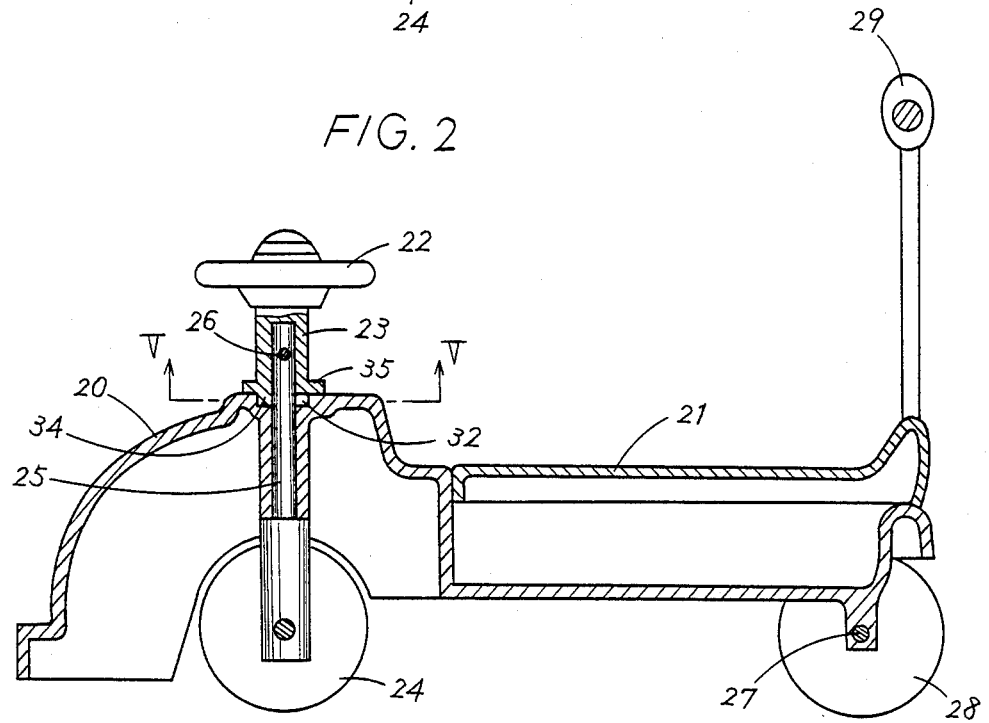
FIG. 2 is a side view, in section, of the toy vehicle of FIG. 1.

Referring to FIGS. 1 and 2, the present toy vehicle has a toy body 20 made of, e.g., rigid plastic material. A relatively rearwardly located portion of the upper surface of the toy body 20 is provided with a seat 21. The seat 21 is preferably adapted to be opened and closed as desired, so that some articles can be stored in the region below the seat 21. A steering wheel 21 is installed at a position where it can be operated by a child seated on the seat 21. The steering wheel 22 has a sleeve 23 depending therefrom.

A front wheel support rod 25 rotatably supporting front wheels 24 projects beyond the upper surface of the toy body 20. The projecting portion has the sleeve 23 of the steering wheel 22 fitted thereon. The sleeve 23 and the front wheel support rod 25 are fixed together as by a screw 26.

A rear axle 27 is supported at the rear portion of the toy body 20, and rear wheels 28 are installed on opposite ends of said rear axle 27. Further, a push rod 29 projects upwardly from the rear end of the toy body 20. The push rod 29 is used in pushing the toy vehicle from behind and is adapted to be removed from the toy body when it becomes unnecessary.

Figure 3:
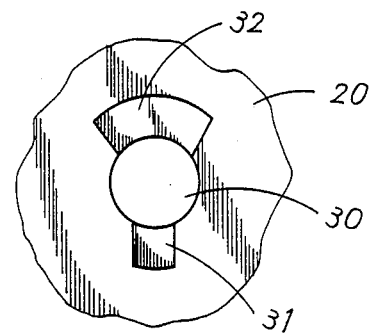
FIG. 3 is a top view of the upper surface of a toy body 20 against which the sleeve 23 of a steering wheel 22 shown in FIG. 2 abuts.

FIG. 3 is a top view of the portion of the upper surface of the toy body 20 against which the sleeve 23 of the steering wheel 22 abuts. As shown, the portion of the upper surface of the toy body 20 around a through-hole 30 for receiving the front wheel support rod 25 (FIG. 2) has a relatively wide groove 32 and a relatively narrow groove 31. The narrow and wide grooves 31 and 32 are each in the form of a recess.

Figure 4:
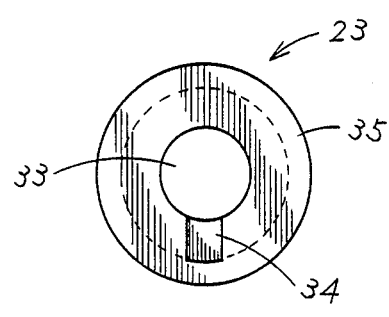
FIG. 4 is a bottom view of the sleeve 23 of the steering wheel.
Figure 5:
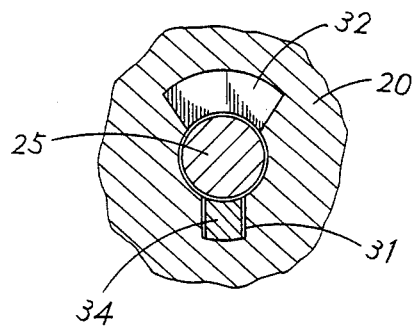
FIG. 5 is a view taken along the line V—V in FIG. 2, showing the state in which the rotation of the steering wheel 22 is inhibited.

FIG. 4 is a bottom view of the sleeve 23 of the steering wheel 22. As shown, the bottom surface of the sleeve 23 is formed with an engaging projection 34 somewhere around a through-hole 30 for receiving the front wheel support rod 25. The engaging projection 34 is sized to snugly fit in the narrow groove 31 shown in FIG. 3. Thus, as shown in FIG. 5, which is a view taken along the line V—V in FIG. 2, when the engaging projection 34 is positioned in the narrow groove 31, the rotation of the sleeve 23, or the rotation of the steering wheel 22, is inhibited. That is, in the state shown in FIG. 5, the turning movement of the front wheels 24 is inhibited.

Figure 6:
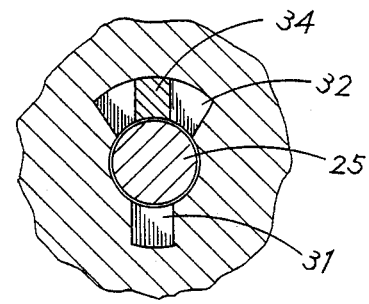
FIG. 6 is a view similar to FIG. 5, but showing the state in which the rotation of the steering wheel is allowed.
Figure 7:
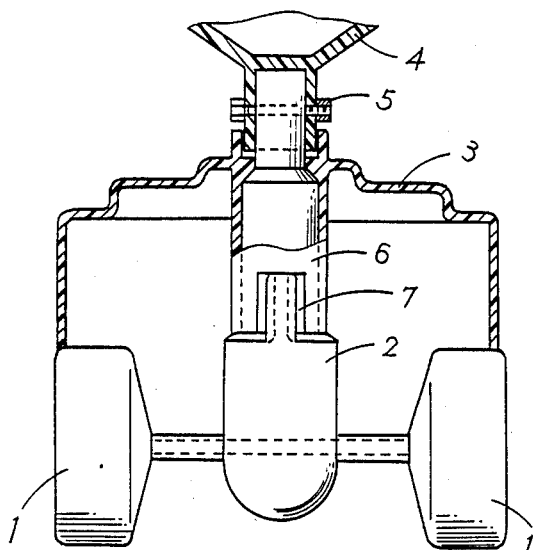
FIG. 7 is an elevational view in section of a steering wheel mechanism for toy vehicles disclosed in Japanese Utility Model Publication No. 17432/1985.
Figure 8:
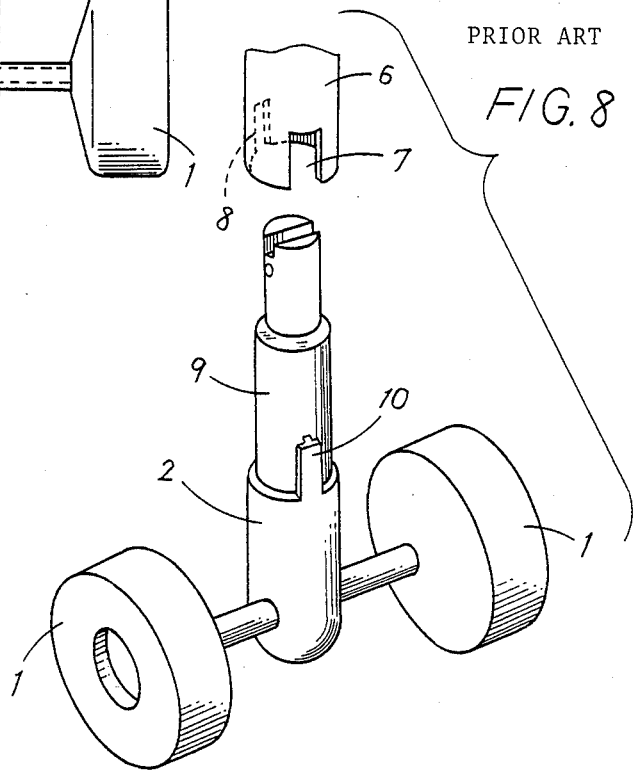
FIG. 8 is a perspective view of main parts of the steering wheel mechanism shown in FIG. 7.

On the other hand, as shown in FIG. 6, when the engaging projection 34 is positioned in the wide groove 32, the rotation of the sleeve 23, or the rotation of the steering wheel 22, is allowed. That is, in the state shown in FIG. 6, the turning movement of the front wheels 24 is allowed.

In addition, to protect the child's fingers against being caught between the engaging projection 34 and the wide groove 32, preferably, the sleeve 23 of the steering wheel 22 has an uninterrupted flange 35 extending over the entire circumference to cover the engaging projection 34 and the grooves 31, 32. In other words, this flange 35 has a diameter sufficient for covering the grooves 31 and 32 and the projection 34 for preventing an injury to a user of the toy by preventing, e.g., a finger from getting pinched in the groove by the projection 34.

The operation of switching between the turn-inhibiting state shown in FIG. 5 and the turn-allowing state shown in FIG. 6 is performed in the following manner: First, the screw 26 shown in FIG. 2 is removed and the steering wheel 22 is extracted from the front wheel support rod 25. And the steering wheel 22 is turned through 180° and then fitted again on the front wheel support rod 25. Finally, the screw 26 is tightened to fix the front wheel support rod 25 and the steering wheel 22 to each other. In this manner, in switching between the aforesaid two states, it is no longer necessary to turn the toy vehicle 20 upside down or to extract the toy body 20 from the front wheel support rod 25.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A steering wheel fixing construction for a toy vehicle, comprising a front wheel support rod rotatably supporting front wheels, said support rod having a rod portion projecting beyond an upper surface of a toy body, said projecting rod portion being adapted to removably receive a sleeve which is integral with a steering wheel, said toy body having a portion of its upper surface extending around said front wheel support rod, said body portion having a relatively narrow groove and a relatively wide groove, said sleeve comprising an engaging projection sized to snugly fit in said narrow groove, the arrangement being such that said engaging projection can be selectively positioned in said narrow groove or said wide groove, said sleeve having an uninterrupted flange with a diameter sufficient for covering said engaging projection, said wide groove, and said narrow groove, said flange resting on said upper surface of said toy body for preventing an injury to a user of said toy vehicle by said engaging projection.

* * * * *